United States Patent Office 3,650,916
Patented Mar. 21, 1972

3,650,916
METHOD FOR THE PRODUCTION OF SULFUR HEXAFLUORIDE
Shunji Nagase, Hajime Baba, Kazuo Kodaira, and Takashi Abe, Nagoya, Japan, assignors to Agency of Industrial Science & Technology, Tokyo, Japan
No Drawing. Filed July 17, 1970, Ser. No. 56,001
Claims priority, application Japan, July 18, 1969, 44/57,188
Int. Cl. B01k 3/00
U.S. Cl. 204—59
2 Claims

ABSTRACT OF THE DISCLOSURE

Carbon monoxide is blown into molten sulfur to produce carbonyl sulfide. The carbonyl sulfide so produced is blown into anhydrous hydrogen fluoride where it is electrolytically fluorinated to produce sulfur hexafluoride.

---

This invention relates to a method for the manufacture of sulfur hexafluoride.

Sulfur hexafluoride is a colorless, odorless, innoxious nonflammable gas having a sublimating point of −63.8° C. It is used extensively as an excellent gaseous electric insulator possessed of high chemical stability.

Heretofore, sulfur hexafluoride has generally been produced by fluorinating sulfur with fluorine gas.

An object of the present invention is to provide a method of manufacturing sulfur hexafluoride by using inexpensive anhydrous hydrogen fluoride directly as a fluorine source without using fluorine gas.

Another object of the present invention is to provide a method of manufacturing sulfur hexafluoride, wherein the fact that the raw material and the product are both in gaseous state lends itself to the purpose of enabling the reaction involved therein to be accomplished extremely easily and continuously.

Still another object of this invention is to provide a method for manufacturing sulfur hexafluoride, which permits the fluorination reaction to be regulated by such factors as feeding rate of raw material, reaction temperature and electrolyzing conditions.

Other objects and characteristics of the present invention will become apparent from further disclosure of the invention which is given below.

The inventors have discovered that sulfur hexafluoride can be produced by blowing such gaseous compound as carbon monoxide or hydrocarbon gas into molten sulfur and causing the resultant gas to be blown continuously into anhydrous hydrogen fluoride through which an electric current is passed.

The apparatus for working the present invention comprises a sulfur melting tube, an electrolytic cell, an unstable gas absorbing bottle, a product collector and the like, which are arranged in series connection. The sulfur melting tube is a U-shaped or straight tube made of glass or iron and is maintained at 200–450° C. The electrolytic cell may be made of any material such as iron or monel which is resistant to the anhydrous hydrogen fluoride. At the bottom of the electrolytic cell is provided a bubbler consisting of a small pipe capped with a porous material such as fabric, filter cloth or porous plate made of polytetrafluoroethylene fiber so that the gas being supplied will be divided into countless, very fine bubbles and, in that state, be dispersed into the anhydrous hydrogen fluoride which serves as an electrolyte. The upper end of the electrolytic cell is connected via a product gas refining device to the product collector. The anode of the electrolytic cell is made of nickel or monel metal and the cathode is made of iron, nickel, nickel alloy or steel.

The operating method of the present invention is now described. Via a flowmeter and then through one end of the sulfur melting tube, carbon monoxide is continuously blown into the molten sulfur which is kept inside the said sulfur melting tube at 200–450° C. The gas which is blown into the molten sulfur is not limited to carbon monoxide. Similarly desirable results are obtained by using such hydrocarbon gases as ethylene and propylene.

When the molten sulfur and the carbon monoxide are reacted in the presence of activated carbon or alumina as a catalyst, a reaction temperature of 350° C. or under is sufficient.

Carbonyl sulfide resulting from the reaction of sulfur and carbon monoxide flows from the other end of the sulfur melting tube and is blown into the anhydrous hydrogen fluoride contained in the electrolytic cell where it is electrolytically fluorinated. The voltage used in electrolysis is 4.5–9 volts and the anode current density is about 1.0–5.0 a./dm.$^2$. The temperature of electrolyte can be chosen anywhere below 19.5° C., that is, below the boiling point of the anhydrous hydrogen fluoride, with the best results obtained between 0 and 10° C.

The reaction is best carried out when the carbonyl sulfide is passed through a bubbler and blown into the electrolytic cell in the form of fine bubbles.

The fluorinated gas which is emitted from the electrolytic cell is first cooled in a copper reflux condenser to permit the vaporized anhydrous hydrogen fluoride to be refluxed for liquefaction and is then passed through the absorbing bottle containing an aqueous solution of sodium sulfite with sodium hydroxide (containing a small amount of potassium iodide) to remove oxygen difluoride, unstable sulfur compounds of low fluorination degree, carbonyl fluoride and the like through absorption. The product gas is additionally cooled with liquefied nitrogen and collected.

Sulfur hexafluoride thus obtained still contains a small amount of by-products which can be separated by, for example, gas chromatography or low-temperature distillation means.

Now, preferred embodiments of the present invention are cited by way of illustration. It should be understood that the invention is, in no way, limited by these examples.

EXAMPLE 1

Carbon monoxide together with a small quantity of helium was introduced, in the presence of active carbon and at a feeding rate of about 19 ml./min., through one end of a melting tube into sulfur maintained at 330° C. inside the melting tube. The gas flowing out of the other end of the melting tube was blown into anhydrous hydrogen fluoride through which passed an electric current (anode current density 3.2 a./dm.$^2$, bath temperature 5–6° C., amount of sodium fluoride added 4 g.). The gas emitted from the electrolytic cell was led via the reflux condenser to the sodium fluoride tube. Here, hydrogen fluoride which coexisted was removed. Then, the gas was passed through the absorbing bottle, wherein oxygen difluoride, sulfur compounds of low fluorination degree and carbonyl fluoride were removed through absorption. The product gas was finally cooled with liquefied nitrogen and forwarded to and collected in the product collector.

By means of infrared absorption spectrometry, gas chromatography, low-temperature distillation and the like, it was confirmed that the product thus obtained was composed mostly of sulfur hexafluoride, with the remaining minor part comprising carbon tetrafluoride, bistrifluoromethyl peroxide and sulfuryl fluoride. In a period of four hours, 6.1 g. of sulfur was lost from the melting tube and 25.8 g. of sulfur hexafluoride was produced. The yield was 93%.

EXAMPLE 2

Substantially the same reaction conditions as those of Example 1 were used, except the melting tube was heated to 335° C. and the feeding rate of carbon monoxide was fixed at about 28 ml./min. The product was treated by following the procedure of Example 1. In a period of four hours, 9 g. of sulfur was lost from the melting tube and 33.2 g. of sulfur hexafluoride was produced. The yield was 81%.

What is claimed is:

1. A method for the production of sulfur hexafluoride, comprising blowing a gaseous compound into molten sulfur, and subsequently blowing the produced gas into anhydrous hydrogen fluoride through which is passed an electric current.

2. A method as set forth in claim 1 wherein the gaseous compound is one selected from the group consisting of carbon monoxide and hydrocarbon gases.

References Cited

UNITED STATES PATENTS

| 2,717,235 | 9/1955 | Prober | 204—59 |
| 2,904,476, | 9/1959 | Man | 204—59 |
| 3,345,277 | 10/1967 | Ashley et al. | 204—59 |

JOHN H. MACK, Primary Examiner

D. R. VALENTINE, Assistant Examiner